United States Patent [19]
Bogdan

[11] Patent Number: 5,375,407
[45] Date of Patent: Dec. 27, 1994

[54] ARRANGEMENT FOR CONNECTING A CHAIN STRAND TO A STRUCTURAL PART

[75] Inventor: Zvonimir Bogdan, Abtsgmünd, Germany

[73] Assignee: RUD-Kettenfabrik Rieger & Dietz GmbH u. Co., Aalen, Germany

[21] Appl. No.: 106,267

[22] Filed: Aug. 13, 1993

[30] Foreign Application Priority Data

Aug. 17, 1992 [DE] Germany ............... 4227467

[51] Int. Cl.$^5$ .................. F16G 15/00; F16G 15/10
[52] U.S. Cl. ........................... 59/93; 59/85; 59/78
[58] Field of Search .............. 59/84, 85, 78, 86, 93; 152/231, 241

[56] References Cited

U.S. PATENT DOCUMENTS

| 3,857,238 | 12/1974 | Gower | 59/93 |
| 4,161,100 | 7/1979 | Dalferth et al. | 59/93 |
| 4,320,620 | 3/1982 | Rieger et al. | 59/93 |

FOREIGN PATENT DOCUMENTS

| 204851 | 8/1957 | Austria | 59/85 |
| 2116362 | 11/1979 | Germany | 59/85 |

OTHER PUBLICATIONS

Rud, "Chains and Components the RUD-System Symbolises Sucess in Mining", 8 pages, Jan. 1991.

*Primary Examiner*—David Jones
*Attorney, Agent, or Firm*—Mark P. Stone

[57] ABSTRACT

In an arrangement for connecting the end link (15) of a chain strand, made up of oval round-material links, to a structural part (16), for the purpose of preventing jamming effects between the end link (15) on the one hand and the structural part (16) and that chain link (23) of the chain strand connected to the end link (15) on the other hand, an insertion piece (1) is inserted into the clear interior (14) of the end link (15) after the end link (15) has already been connected to the respective structural part (16). In order to ensure the problem-free insertion of the insertion piece (1) into the clear interior (14) of the end link (15), the insertion piece is provided with guide recesses which exhibit more or less considerably shortened stop cheeks (4, 7) for the legs (17, 18) of the end link.

5 Claims, 2 Drawing Sheets

ARRANGEMENT FOR CONNECTING A CHAIN STRAND TO A STRUCTURAL PART

BACKGROUND OF THE INVENTION

The invention relates to an arrangement for connecting the end link of a chain strand, made up of oval round-material links, to a structural part, in which arrangement, in the clear interior of the end link limited by that part of the structural part reaching into the end link and by the chain link connected to the end link there is mounted, in such a way as to be movable by limited amounts to and fro, an insertion piece, which exhibits a first guide recess and a thereto opposing second guide recess having, in each case, a pair of stop cheeks for the mutually opposite inner sides of the legs of the end link and which is provided with deflector flanks which face the roundings of the end link and prevent the legs of the end link from jamming in relation to the structural part and to the chain link suspended in the end link.

An arrangement of the above type is known from DE 32 46 490 C2. In the known arrangement, the insertion piece consists of an essentially cuboid basic element which is provided with two grooves, the zenithal lines of which lie in planes standing perpendicular to each other, the one groove forming the deflector flanks and the other groove forming guide recesses for the insertion piece in the end link. Due to the essentially cuboid construction of the insertion piece, this can only be introduced into the end link when the latter is not yet connected to the structural part.

SUMMARY OF THE INVENTION

The object of the invention is to provide an arrangement of the considered type in which the insertion piece can also be introduced into the end link retrospectively, i.e. after the end link has already been connected to the structural part. This object is achieved according to the invention by the use of a modified insertion piece in which the first guide recess exhibits a long stop cheek and a stop cheek which is shortened on one side, whilst the second guide recess is provided with two stop cheeks which are shortened on one side and which are shorter than the long stop cheek and longer than the shortened stop cheek of the first guide recess, by the fact that the insertion piece can be swivelled out of an initial position, in which the guide recesses run obliquely to the legs of the end link, initially in a first plane, into an intermediate position in the clear interior of the end link and can then be transported out of this intermediate position, in a second plane lying essentially perpendicular to the first plane, into an end position, in which the guide recesses are orientated in the direction of the legs of the end link, and by the fact that those ends of the stop cheeks of the second guide recess which are located opposite the shorter stop cheek of the first guide recess are provided with aligned boreholes for the reception of a locking pin which prevents the insertion piece from swivelling back out of its end position into its intermediate position.

By virtue of the fact that, in the arrangement according to the invention, the insertion piece can be inserted retrospectively into the clear interior of that end link of a chain strand which is already joined up to a structural part, the connection of the chain strand to the respective structural part is in many cases facilitated.

BRIEF DESCRIPTION OF THE DRAWINGS

The invention is explained further below with reference to a particularly advantageous illustrative embodiment represented in the appended drawing, in which.

DESCRIPTION OF THE BEST MODES FOR CARRYING OUT THE INVENTION

Figure 1:
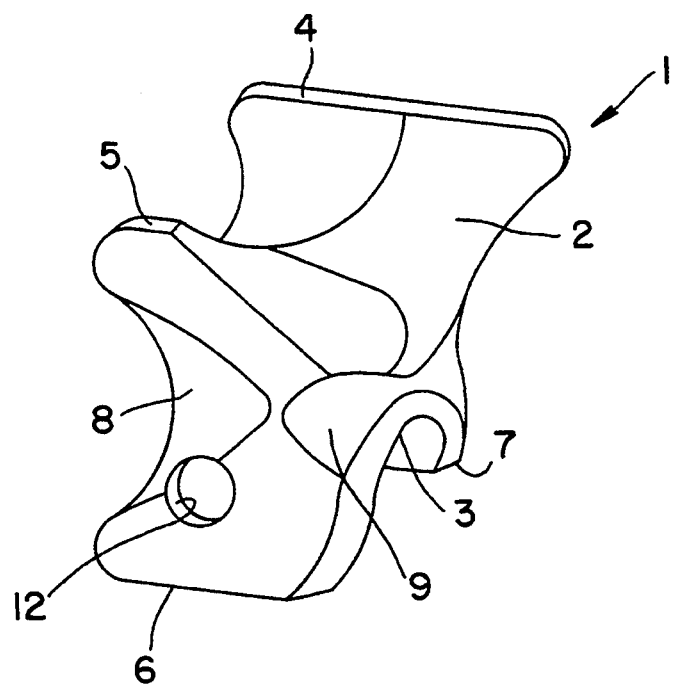
FIG. 1 shows a first perspective view of an insertion piece.
Figure 2:
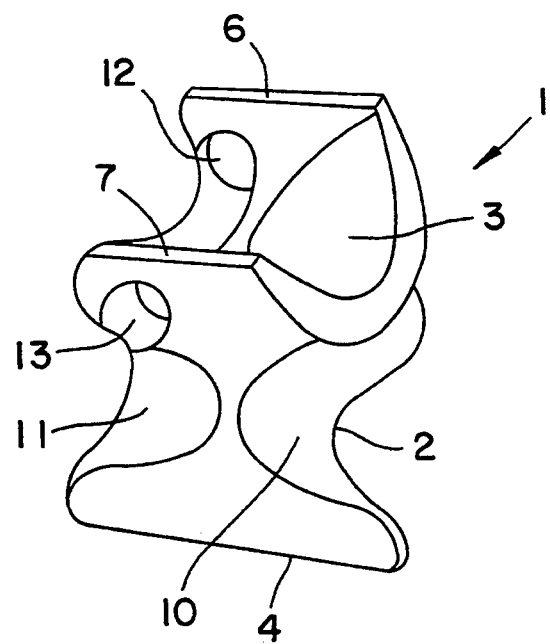
FIG. 2 shows a second perspective view of the insertion piece.

The insertion piece, denoted generally in the figures by 1, exhibits a first guide recess 2 and a second guide recess 3. The first guide recess 2 possesses a long stop cheek 4 and a stop cheek 5 which is considerably shortened in relation thereto, the length of the stop cheek 5 equalling approximately one-third that of the stop cheek 4. The second guide recess 3 is provided, by contrast, with two stop cheeks 6 and 7 which are shortened by equal amounts in relation to the long stop cheek 4 of the first guide recess and the length of which equals approximately two-thirds of that of the long stop cheek 4 of the first guide recess. In addition, the insertion piece 1 is provided with deflector flanks 8 to 11, which prevent an end link equipped with an insertion piece from jamming in relation to a structural part connected to the end link. As is especially apparent from FIG. 2, the stop crosspieces 6 and 7 are provided with aligned boreholes 12 and 13 for the reception of a locking pin. Preferably, as illustrated by FIGS. 1–2, the insertion piece 1 is a unitary element formed in a unitary construction as a single piece.

Figure 3:
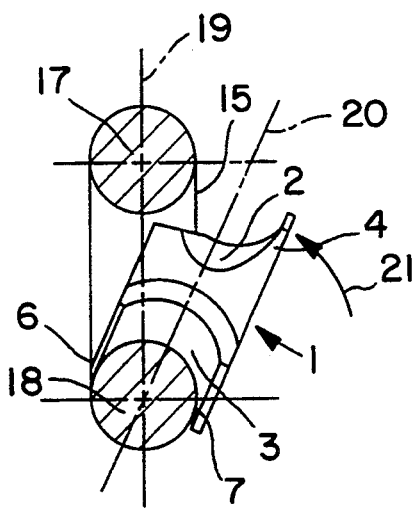
FIG. 3 shows the swivelling-in of the insertion piece into the clear interior of the end link.
Figure 4:
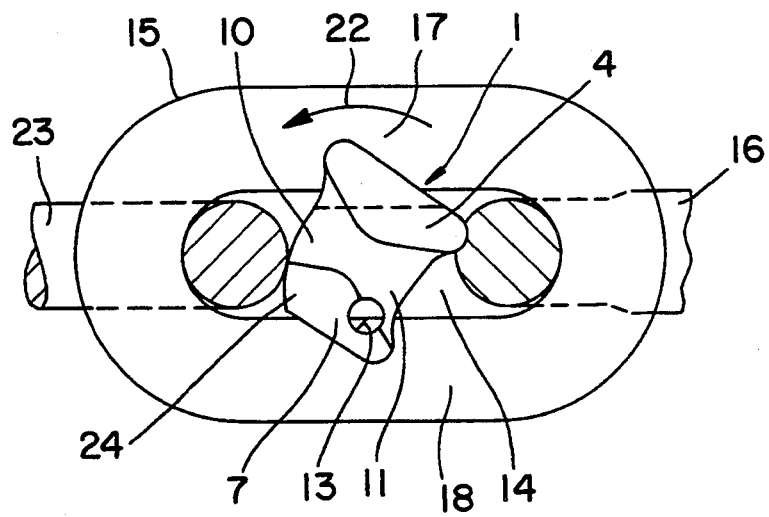
FIG. 4 shows the rotation into the correct position of the insertion piece swivelled into the clear interior of the end link.
Figure 5:
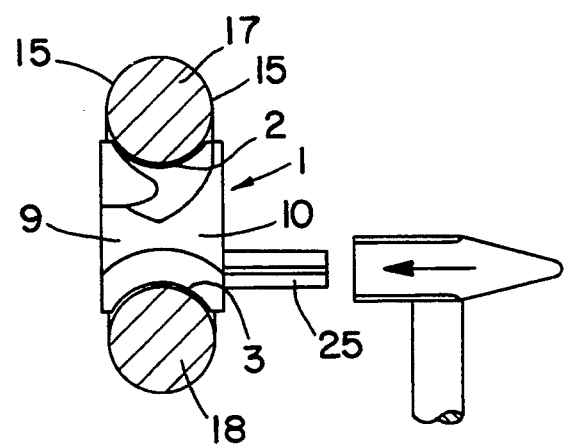
FIG. 5 shows the securement of the insertion piece in its end position.

FIGS. 3 to 5 show that, as a result of the shortening of the stop cheeks 5 to 7 of the insertion piece 1, the preconditions have been created to allow the insertion piece 1 to be swivelled into the clear interior 14 of an end link 15 once the latter is already connected to a structural part 16 formed regularly by a chain joint. When the insertion piece 1 is swivelled into the plane 19 running through the middles of the legs 17 and 18 of the end link 15, the insertion piece 1 assumes the position represented in FIG. 3, in which position the guide recesses 2 and 3 run obliquely to the longitudinal axes of the legs 17 and 18. As soon as the plane of the insertion piece 1, denoted in FIG. 3 by 20, coincides with the plane 19 of the end link 15 following completion of the swivel movement in the direction of the arrow 21, the insertion piece can be rotated in the direction of the arrow 22 in FIG. 4 and transported out of its intermediate position into its end position. The introduction of the insertion piece 1 into the clear interior 14 of the end link 15 is in other words, realised by swivel movements in two planes lying essentially perpendicular to each other. The contour of the flank 24 facing the chain link 23 connected to the end link 15 precludes any jamming of the insertion piece 1 in the clear interior 14 of the end link as this movement occurs. As soon as the insertion piece has reached its end position, a locking pin 25 can be knocked into the boreholes 12, 13, as is indicated in FIG. 5.

I claim:

1. An arrangement for connecting an end link of a chain strand, formed from oval round-material links each defining a clear interior space between a pair of opposed longitudinally extending legs and a pair of round end portions, to a structural part, in which arrangement, in the clear interior space of the end link between a portion of the structural part extending into the end link and an adjacent chain link connected to the end link, an insertion piece is movably mounted to said end link for limited movement in a longitudinal direction along said clear interior space of said end link, said insertion piece defining a first guide recess and an opposing second guide recess, said first and said second guide recesses each defining a pair of stop cheeks operatively associated with mutually opposite inner sides of the opposed legs of the end link, said insertion piece further defining deflector flanks which face the round end portions of the end link and prevent the legs of the end link from jamming in relation to the structural part and to the adjacent chain link connected to the end link, the first guide recess (2) having a longer stop cheek (4) and a shorter stop cheek (5), the second guide recess (3) having two stop cheeks (6, 7) which are each shorter than the longer stop cheek of said first guide recess and are each longer than the shorter stop cheek of the first guide recess (2), such that the insertion piece (1) is swivelled out of an initial position, in which the first and second guide recesses (2, 3) are oriented obliquely relative to the opposed pair of legs (17, 18) of the end link (15), initially along a first plane, into an intermediate position in the clear interior space (14) of the end link (15), and said insertion piece is thereafter moved out of said intermediate position, along a second plane oriented essentially perpendicular to the first plane, and into an end position, in which the first and second guide recesses (2, 3) are oriented in the longitudinally extending direction of the opposed pair of legs (17, 18) of the end link (15), the stop cheeks (6, 7) of the second guide recess (3) having ends which are located opposite the shorter stop cheek (5) of the first guide recess (2) and which are provided with aligned bore holes (12, 13) for receiving a locking pin (25) bridging said stop cheeks of said second guide recess for preventing the insertion piece (1) from swivelling out of said end position and into said intermediate position.

2. The arrangement according to claim 1, wherein the length of the shorter stop cheek (5) of the first guide recess (2) equals approximately one-third the length of the longer stop cheek (4) of said first guide recess (2).

3. The arrangement according to claim 1, wherein the length of the stop cheeks (6, 7) of the second guide recess (3) equals approximately two-thirds of the length of the longer stop cheek (4) of the first guide recess (2).

4. The arrangement according to claim 2, wherein the length of the stop cheeks (6, 7) of the second guide recess (3) equals approximately two-thirds of the length of the longer stop cheek (4) of the first guide recess (2).

5. The arrangement as claimed in claim 1 wherein said insertion piece is a unitary element.

* * * * *